Jan. 28, 1930.  H. T. HALLOWELL  1,745,258
HAND TRUCK
Filed April 9, 1927   3 Sheets-Sheet 1

Inventor:
Howard T. Hallowell,
by his Attorneys

Jan. 28, 1930.  H. T. HALLOWELL  1,745,258
HAND TRUCK
Filed April 9, 1927   3 Sheets-Sheet 2
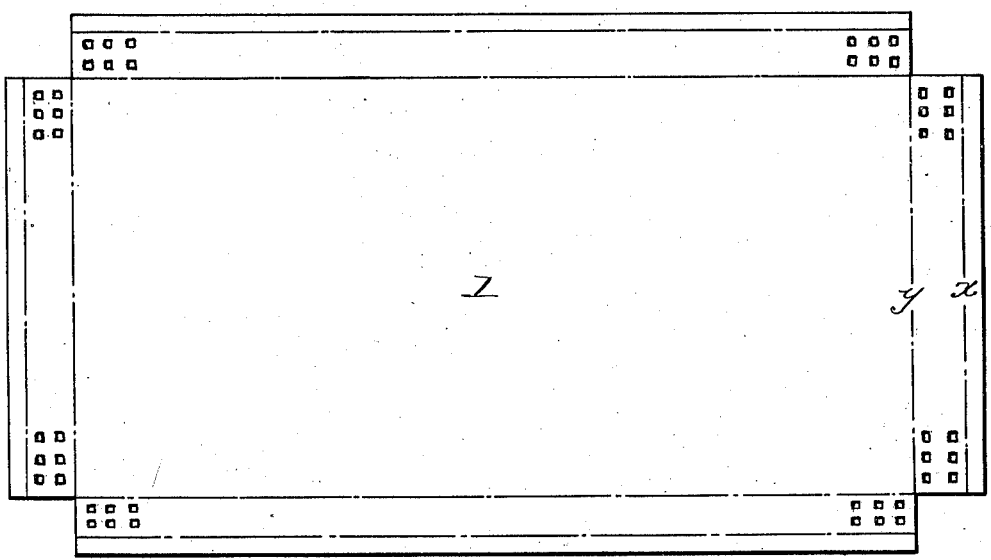
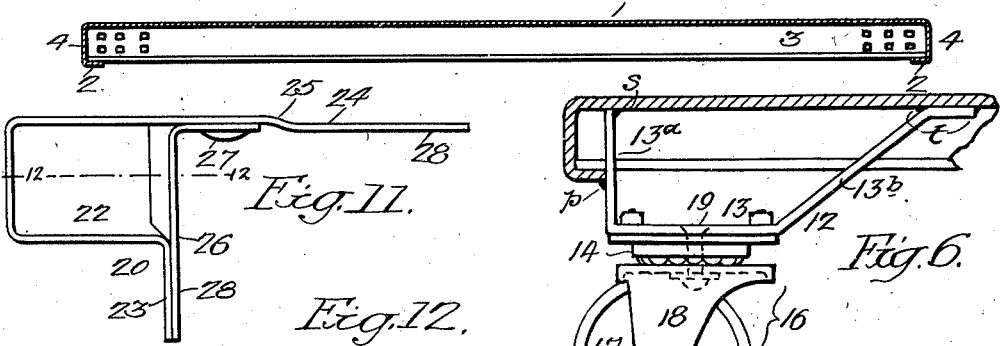
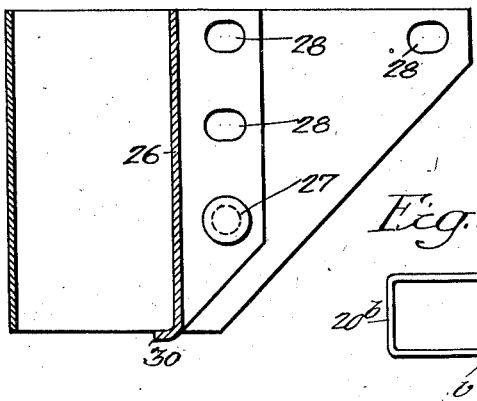
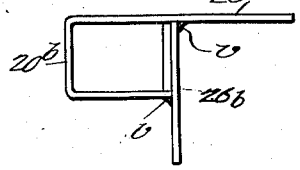
Inventor:—
Howard T. Hallowell,
by his Attorneys
Howson & Howson

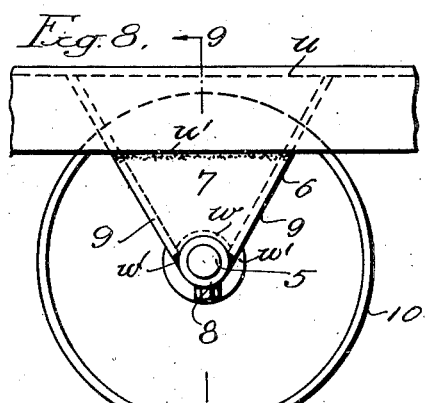
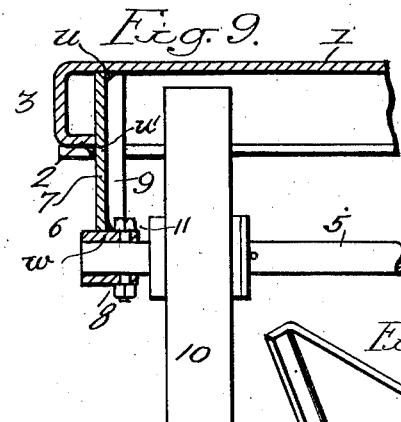
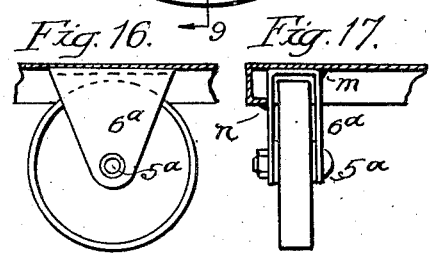
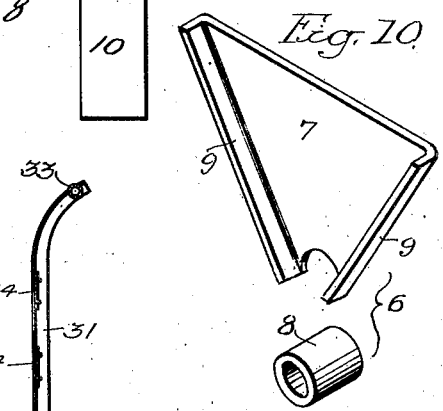
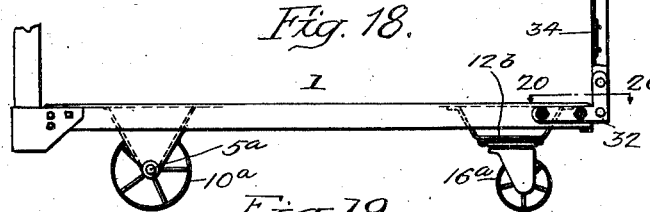
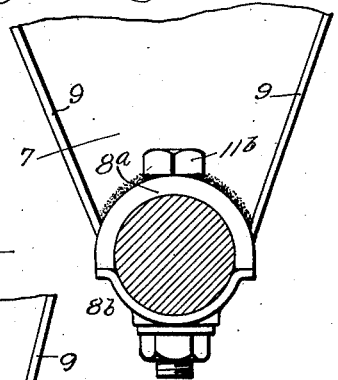
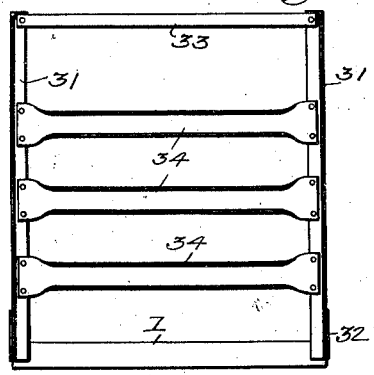
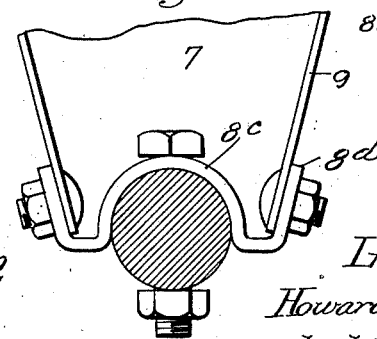
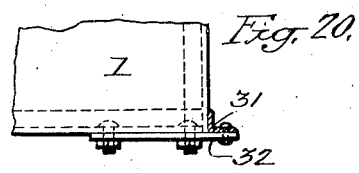

Patented Jan. 28, 1930

1,745,258

UNITED STATES PATENT OFFICE

HOWARD T. HALLOWELL, OF JENKINTOWN, PENNSYLVANIA, ASSIGNOR TO STANDARD PRESSED STEEL COMPANY, OF JENKINTOWN, PENNSYLVANIA, A CORPORATION OF PENNSYLVANIA

HAND TRUCK

Application filed April 9, 1927. Serial No. 182,373.

The object of my invention is to make a substantial and comparatively cheap hand platform truck which will withstand the rough usage to which such a truck is subjected.

In the accompanying drawings:

Fig. 3 is a plan view showing the sheet metal blank from which the platform is formed;

Fig. 4 is a longitudinal sectional view of the platform after being formed;

Fig. 6 is a side view of one of the casters, the platform being in section;

Fig. 7 is a plan view of the caster shown in Fig. 6;

Fig. 8 is a side view of one of the bearings for the axle;

Fig. 9 is a sectional view on the line 9—9, Fig. 8;

Fig. 10 is a detached perspective view of the two parts of the axle bearing prior to being welded together;

Fig. 11 is a plan view of a square stake pocket;

Fig. 12 is a sectional view on the line 12—12, Fig. 11;

Fig. 13 is a plane view of a modification of the square stake pocket;

Figs. 14, 15, 16 and 17 are views illustrating modifications of the axle bearings;

Fig. 18 is a side view of a platform truck slightly modified and provided with a handled rack at one end;

Fig. 19 is an end view of the platform truck shown in Fig. 18;

Fig. 20 is a plan view of one corner of the truck shown in Fig. 18, the side member of the rack being in section;

Referring particularly to Figs. 1 to 4 inclusive, the platform 1 is preferably made from a single sheet of metal. The blank is formed and cut at the corners as shown in Fig. 3. The edges of the blank are bent on the line $x$ to form a narrow reinforcing flange 2, and then bent on the line $y$ to form the sides 3 and ends 4 of the platform as shown in Fig. 4. The sides 3 and ends 4 are preferably welded at the corners, making a very substantial platform. In large trucks, the platform may be reinforced by one or more cross-bars welded or otherwise secured to the platform.

Figure 5:
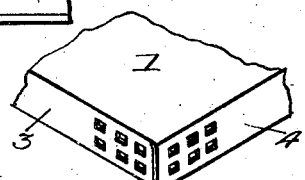
Fig. 5 is a detached perspective view of one corner of the platform.

As shown in Figs. 3 and 5, the ends and sides of the platform may have a number of perforations at the corners, so that different types of stake pockets may be secured thereto. Thus the platforms may be made in quantities and held in stock, the fittings being applied as orders are received.

The axle 5 of the truck is mounted in bearings 6—6 depending from the underside of the platform. Each bearing is made in two parts, a body portion 7 and a journal box 8. The body portion 7 is bent to form flanges 9 at each side, and the lower end has a curved recess therein to receive the cylindrical journal box 8, which is welded thereto at $w$ and $w'$. The body portion of each bearing 6 is welded to the platform at $u$ and to the inturned flange at $u'$.

Mounted on the axle are wheels 10. The axle 5 is held from rotating in the bearings by bolts 11, leaving the wheels 10 free to turn on the axle in the present instance, but in some instances the axle may turn in the bearing.

Figure 1:
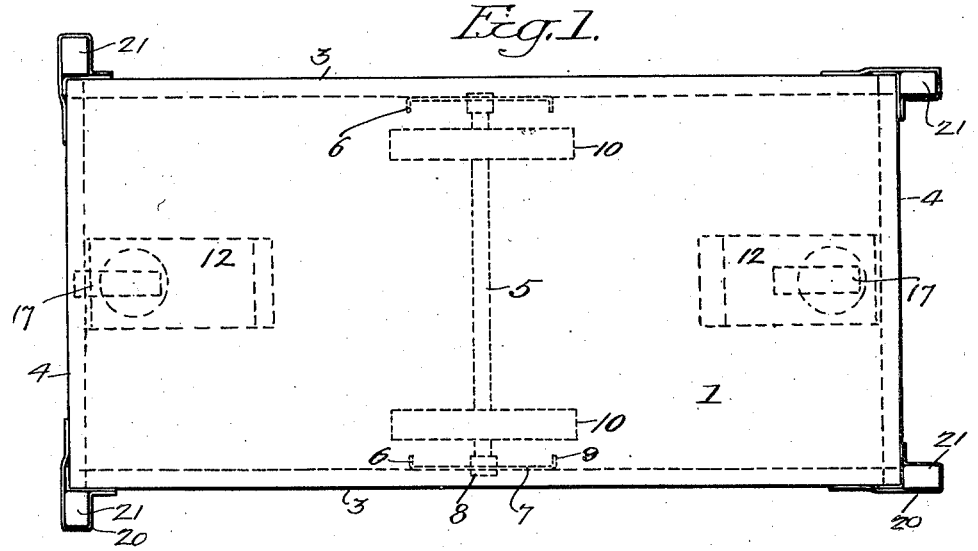
Fig. 1 is a plan view of my improved hand truck.
Figure 2:
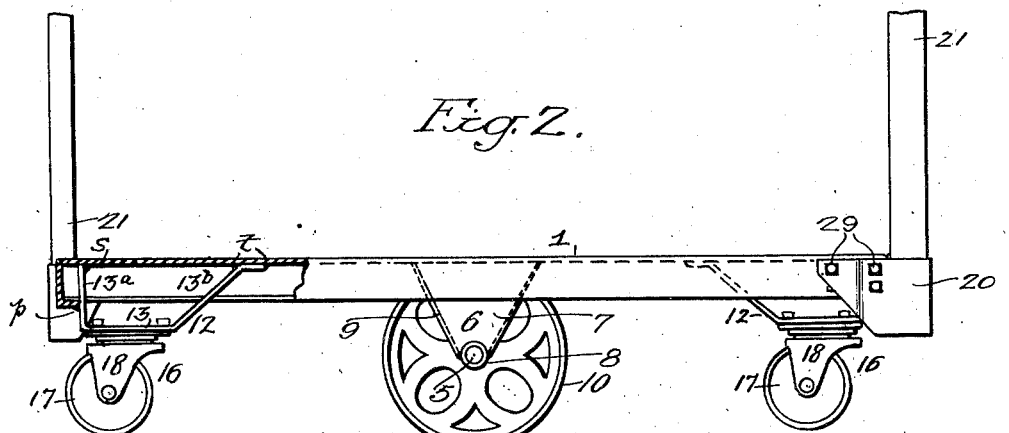
Fig. 2 is a side view of the same, partly in section.

Brace plates 12 are secured to the underside of the platform near each end as shown in Fig. 2. Each plate is bent as shown in Figs. 6 and 7 to form a flat bearing portion 13, a vertical portion $13^a$, and an inclined portion $13^b$.

A wear plate or race plate 14 (when ball-bearings are used) is secured to the bearing portion 13 as shown in Fig. 6. The inclined portion $13^b$ is secured to the body of the platform by welding as at $t$, and the vertical portion $13^a$ is secured to the body of the platform at $s$ and to the inturned flange of the platform at $p$. The plate is made wide to accommodate the wear plates of the caster 16 and also to resist any strains to which the caster is subjected. Each caster has a wheel 17 mounted on a spindle carried by a forked portion 18. The spindle 19 of the caster projects through an opening in the bearing plate and in the plate 12. If a ball-bearing is used, then the bearing plate of the caster is in the form of a raceway and balls are located between the two raceways as shown in Fig. 6.

By the above construction, the casters and their bearings will withstand considerable rough usage, as the plate 12 resists any pressure exerted on the caster and its parts.

At the corners of the platform are stake pockets 20, shown in Figs. 11 and 12. These pockets have rectangular openings in the present instance to fit correspondingly shaped stakes 21. Each pocket is made from a metal plate cut and bent to form the pocket portion 22 and two extensions 23 and 24. The extension 24 is longer than the extension 23 and is bent as at 25. A back plate 26 closes the open side of the pocket and is welded to the extension 23, or the plate may be welded or secured to the extension 24 by a rivet 27. Elongated bolt holes 28 are formed in the two extensions to receive the bolts 29 which extend through certain of the perforations at the corners of the platform.

The socket portion is extended as shown in Fig. 12, and the plate 26 has an inturned flange 30 which acts as a stop for the end of the stake 21.

The stake pockets may be made as shown in Fig. 13. In this instance the plate 20$^b$ is shaped substantially as shown in Figs. 9 and 10, and the plate 26$^b$ may be a flat plate welded to the plate 20$^b$ at $v$—$v$.

The axle bearing may be made as shown in Fig. 14. In this instance the journal box 8$^a$ is a half-box welded to the part 7, and a cap plate 8$^b$ when used is secured in place by the bolt 11$^b$. In some instances the cap plate may be omitted.

In Fig. 15 is shown a modification of the bearing, in which a piece of metal is shaped to form a half-bearing 8$^c$, and has extensions 8$^d$ which are secured to the flanges 9 of the body 7 of the bearing.

In each of Figs. 16 and 17 a modification of the bearing for the axle is shown, the bearing 6$^a$ being U-shaped and welded to the body of the platform at $m$ and to the inturned flange at $n$. The axle 5$^a$ is short as shown in Fig. 17.

When an end rack is used, as in Figs. 18 and 19, side members 31, angular in cross-section as in Fig. 20, are connected to the platform by knee-plates 32, which are securely attached to the platform and to the side members of the rack by bolts or other fastening means.

The upper ends of the side members are bent outward, and a hollow handle bar 33 is attached to the ends of the side members by rivets which pass through one of the angle flanges of each side member and through the flattened ends of the handle bar.

Intermediate cross-pieces 34 extend from one side member to the other and are riveted or welded to said side members. The cross-pieces may be stiffened by flanges as in Fig. 19, or deep corrugations may be formed in the cross-pieces for the same purpose.

In Fig. 18 the main axle 5$^a$ is at one end of the truck, and two swivel casters 16$^a$ are located at the rack end of the truck. Each caster is mounted under a plate 12$^b$ which extends to the underside of the platform and is welded thereto.

Figure 21:
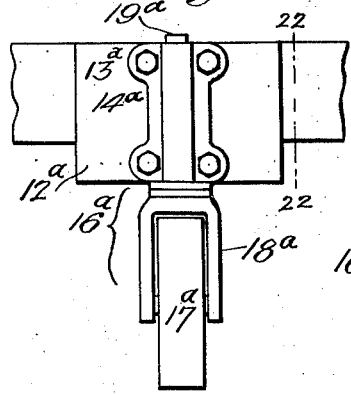
Fig. 21 is an end view showing a modification of the caster.
Figure 22:
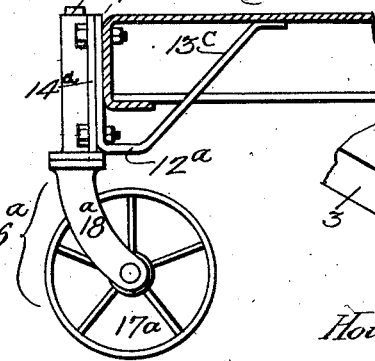
Fig. 22 is a side view showing the platform in section on the line 22—22, Fig. 21.

In Figs. 21 and 22 are shown modifications of the casters.

Secured to each end of the platform are brace plates 12$^a$, bent as shown in Fig. 7 so as to form a rearwardly extending strut 13$^c$ which is welded or otherwise secured to the underside of the platform. The vertical portion 13$^d$ extends between a vertical spindle bearing 14$^a$ and the end of the platform, bolts securely holding the bearing to the brace plate and platform. Each caster 16$^a$ has a wheel 17$^a$ mounted on a spindle carried by the forked portion 18$^a$ of the caster, and projecting from the forked portion is a spindle 19$^a$ mounted in the bearing 14$^a$.

I claim:—

1. The combination in a platform truck, of a body portion bent at each end to form deep flanges; bearing plates under the platform, each plate having a horizontal portion, a vertical portion, and an inclined strut portion, said vertical portion being welded to the underside of the body of the platform and to the flange thereof, and the inclined portion being also welded to the underside of the body of the platform; and a caster mounted under the bearing plate.

2. The combination in a platform truck, of a body portion bent at the ends to form deep inturned flanges; bearing plates under the platform, each plate having a horizontal portion, a vertical portion, and an inclined strut portion, the vertical portion and the inclined strut portion being welded to the underside of the body of the truck, and the vertical portion being also welded to the inturned flange of the platform; a wear plate secured to the horizontal portion of the bearing plate; and a caster pivotally mounted under the bearing plate.

3. The combination in a platform truck, of a platform having a deep inturned flange; an axle; wheels; and bearings for the axle welded to the underside of the platform and to the inturned portion of the flange.

4. The combination in a platform truck, of a platform having a deep inturned flange; and a wheel-bearing, said bearing being welded to the underside of the platform and to the inturned edge of the flange of said platform.

5. The combination in a platform truck, of a platform having deep side flanges; an axle; wheels on the axle; bearings for the axle extending to the under-side of the platform and welded thereto and to the deep side flanges thereof, the body portion of each bearing having lateral flanges and recessed at its lower end between the flanges; and a journal box mounted in the recess and secured to said bearing.

HOWARD T. HALLOWELL.